United States Patent
Griffiths et al.

(10) Patent No.: US 9,900,961 B2
(45) Date of Patent: Feb. 20, 2018

(54) MODULAR LIGHTINGS SYSTEMS HAVING PRESENCE SENSORS

(75) Inventors: Bryn Griffiths, Hong Kong (CN); Jon Duncan, Middlesex (GB)

(73) Assignee: BENMORE VENTURES LIMITED, Tortola (VG)

( * ) Notice: Subject to any disclaimer, the term of this patent is extended or adjusted under 35 U.S.C. 154(b) by 0 days.

(21) Appl. No.: 14/119,567

(22) PCT Filed: May 25, 2012

(86) PCT No.: PCT/GB2012/051187
§ 371 (c)(1),
(2), (4) Date: Jan. 20, 2014

(87) PCT Pub. No.: WO2012/160390
PCT Pub. Date: Nov. 29, 2012

(65) Prior Publication Data
US 2014/0125232 A1    May 8, 2014

(30) Foreign Application Priority Data
May 25, 2011  (GB) .................................. 1108802.8

(51) Int. Cl.
*H05B 33/08*    (2006.01)
*H05B 37/02*    (2006.01)
(Continued)

(52) U.S. Cl.
CPC .......... *H05B 37/0227* (2013.01); *F21S 2/005* (2013.01); *F21S 9/02* (2013.01);
(Continued)

(58) Field of Classification Search
CPC ............ H05B 33/0815; H05B 33/0818; H05B 37/029; H05B 37/02; H05B 41/3925; H05B 41/391; H05B 41/2828; H05B 33/0803
(Continued)

(56) References Cited

U.S. PATENT DOCUMENTS

2006/0022214 A1* 2/2006 Morgan ..................... F21K 9/00
                                                          257/99
2006/0039135 A1* 2/2006 Jones et al. .................... 362/145
(Continued)

FOREIGN PATENT DOCUMENTS

CN    1404781 A      3/2003
CN    101351067      1/2009
(Continued)

OTHER PUBLICATIONS

International Search Report and Written Opinion in co-pending, related PCT Application No. PCT/GB2012/051187, dated Oct. 22, 2012.
(Continued)

*Primary Examiner* — Douglas W Owens
*Assistant Examiner* — Syed M Kaiser
(74) *Attorney, Agent, or Firm* — Thomas | Horstemeyer, LLP (57) ABSTRACT

A modular lighting system (100) comprising a plurality of interconnected generally planar units (15, 115, 215), each unit having at least one illumination element (31), and an electrical circuit for connection to an adjacent unit and comprising a respective sensor (16, 17) associated with each illumination element, the sensor being arranged to be actuated by the presence of an article over or adjacent to the respective illumination element, and the system being controlled such that when the presence of one or more articles
(Continued)

is sensed, the illumination is enabled of one of the illumination elements. Each unit has a further sensor (45) for detecting the approach of a person and illumination is effected only when both said presence sensor and said further sensor are actuated. The further sensor may be a proximity sensor, a vibration sensor or temperature sensing means.

19 Claims, 5 Drawing Sheets

(51) Int. Cl.
```
F21S 2/00       (2016.01)
F21S 9/02       (2006.01)
F21V 21/005     (2006.01)
F21V 21/096     (2006.01)
F21V 23/04      (2006.01)
F21V 23/06      (2006.01)
F21W 131/405    (2006.01)
F21Y 105/10     (2016.01)
F21Y 115/10     (2016.01)
```
(52) U.S. Cl.
CPC .......... *F21V 21/005* (2013.01); *F21V 21/096* (2013.01); *F21V 23/045* (2013.01); *F21V 23/0471* (2013.01); *F21V 23/0492* (2013.01); *F21V 23/06* (2013.01); *F21W 2131/405* (2013.01); *F21Y 2105/10* (2016.08); *F21Y 2115/10* (2016.08); *Y02B 20/44* (2013.01)

(58) Field of Classification Search
USPC ........ 315/297, 294; 362/234, 225, 145, 308, 362/398
See application file for complete search history.

(56) References Cited

U.S. PATENT DOCUMENTS

| | | | |
|---|---|---|---|
| 2009/0086478 A1* | 4/2009 | Sanroma ................. | A47F 3/001 362/234 |
| 2010/0219758 A1* | 9/2010 | Melzner et al. ............... | 315/113 |
| 2010/0328438 A1* | 12/2010 | Ohyama ............ | G02B 27/2214 348/51 |
| 2011/0084627 A1* | 4/2011 | Sloan ...................... | F21S 4/003 315/297 |
| 2011/0241559 A1* | 10/2011 | Grajcar .......................... | 315/250 |
| 2011/0255303 A1* | 10/2011 | Nichol .................. | G02B 6/006 362/606 |
| 2012/0043910 A1* | 2/2012 | Nagashima .......... | H05B 33/086 315/294 |
| 2013/0292705 A1* | 11/2013 | Makimura ........ | H01L 31/02164 257/81 |
| 2014/0125232 A1* | 5/2014 | Griffiths et al. .............. | 315/154 |

FOREIGN PATENT DOCUMENTS

| | | | | |
|---|---|---|---|---|
| EP | 1 500 958 A1 | | 1/2005 | |
| FR | 2898183 | * | 3/2006 | ............ H05B 37/02 |
| FR | 2 898 183 | | 9/2007 | |
| SE | 533585 | | 11/2010 | |
| WO | 2008/051464 A1 | | 5/2008 | |
| WO | WO 2008051464 A1 | * | 5/2008 | ............ H05B 37/02 |

OTHER PUBLICATIONS

JP Office Action in co-pending, related JP Application No. 201280032990.6, dated Jul. 18, 2016 (with English Translation).

\* cited by examiner

MODULAR LIGHTINGS SYSTEMS HAVING PRESENCE SENSORS

CROSS-REFERENCE TO RELATED APPLICATION

This application is the 35 U.S.C. §371 national stage of PCT Application No. PCT/GB2012/051187, entitled "Modular Lightings Systems Having Sensors for Touch, Presence, Movement" and filed May 25, 2012, which is herein incorporated by reference in its entirety and which also claims priority to, and the benefit of, Great Britain application no. 1108802.8, filed May 25, 2011, which is herein incorporated by reference in its entirety.

The present invention relates to a modular lighting system and to components thereof, and in particular to a system comprising two or more interlocking panels, each incorporating one or more illuminating means.

In supermarkets and other shopping environments, there is an ever-increasing need to attract customers and to differentiate products such as bottles, from competitors' products. It has already been proposed, in WO 2004/110892, to provide a container which contains illumination means which are activated when touching by or the approach of a person is detected.

Aspects of the present invention seek to provide a more convenient alternative.

According to a first aspect of the present invention there is provided a modular lighting system comprising a plurality of interconnected generally planar units, each unit having at least one illumination element arranged to emit light from a major surface of the unit, and an electrical circuit incorporating the respective illumination element(s) and having means arranged to connect it to an adjacent unit, each electrical circuit further comprising a respective sensor associated with each illumination element, the sensor being arranged to be actuated by the presence of an article over or adjacent to the respective illumination element, the system being controlled such that when the presence of one or more articles is sensed, the illumination is enabled of at least a selected one of the illumination elements.

Such a system enables an area, such as a supermarket shelf, of any size and shape to be covered with an array of the units. In preferred systems, the units are identical and there is only a single way of connecting adjacent units; this means that the system can be assembled, disassembled and reassembled without the need for training. By having electrical connections between the units of the system, a common electrical supply can be provided, and this may be in the form of a battery power pack at the back of the shelf and out of sight. This enables a relatively large power supply to be used which only needs to be replaced relatively rarely.

The power pack may have electrical connection means compatible with the connection means between the units, whereby it can be connected at an otherwise free end of the system.

Preferably, the illumination elements of all the units are arranged in a line and said at least one selected illumination element corresponds to the endmost sensor which senses the presence of an article. This is an efficient energy-saving arrangement since no energy is wasted in illuminating articles which are not at the front of the line, i.e. which are not visible to the customers. The system can determine which is the endmost sensor, at least partially, by detecting the absence of an electrical connection to an endmost unit. Thus the system automatically determines which is the endmost unit without external intervention.

In preferred embodiments at least one of the units comprises a further sensor, actuation of which enables illumination of said at least one selected illumination element. The further sensor preferably senses the presence or movement of a person adjacent to the system. The or each illuminated element is preferably illuminated only when both sensors are actuated and this represents a further energy-saving feature. The further sensor may be a proximity sensor or a temperature sensor located at or adjacent on end of each unit, or it may be a vibration sensor.

Mechanical connection elements may be provided between the units of the system, and they may be separate from or combined with the electrical connection elements.

The units may incorporate magnetic locating elements for locating the units on metal shelving and/or for maintaining adjacent lines of units in position relative to one another.

The sensor for sensing articles may comprise a sheet of flexible material upon which an article is arranged to be placed, and at least one pressure-sensitive switch located beneath the sheet. The sheet provides protection for the pressure-sensitive switch and also provides a large surface area to optimise actuation of the switch. More than one pressure-sensitive switch may be provided beneath each sheet to increase operating reliability. At the front of each line of units there may be provided an electrical display element having electrical connection means compatible with the connection means between the units, whereby it can be connected to an endmost unit. The electrical display element may be planar and may extend transversely, in particular substantially perpendicularly, to the endmost unit. In preferred arrangements the electrical display element is oriented vertically.

According to a second aspect of the present invention, there is provided a generally planar unit having at least one illumination element on a major surface thereof, electrical circuits for providing electrical power to the illumination element, the circuits comprising at least one first sensor for sensing the presence of an article over or adjacent to the illumination means, and a second sensor for sensing the presence or movement of a person adjacent to the unit, and externally accessible electrical connection means for connecting the circuits to a similar unit.

According to a third aspect of the present invention, there is provided a generally planar unit having at least one illumination element on an upper major surface thereof, circuitry for providing electrical power to the illumination element, a communications link connected to control the illumination element, and at least one sensor device, the output of which is connected to control the communications link.

The sensor device can be a proximity sensor or a vibration sensor. It can be sensitive to music. A temperature sensing sensor may be included. More than one type of such sensors may be provided.

The proximity sensor can be provided in a front end face of the unit. The communication link may have ports in the front and rear end faces of the unit. Such ports are useful for communicating with similar units arranged end to end on a common surface, such as a supermarket shelf.

The end faces of the unit may have mechanical interlocking elements. The interlocking elements may additionally include electrical connections.

The illumination element may be located in a product placement area. The product placement area may be shaped to match the bottom of a product placed thereon.

Means may be provided in or adjacent to the product placement area for detecting the presence of a product thereon. The output of the product detecting means is also connected to control the communications link.

The lower major surface of the unit may incorporate attachment means, e.g. solid magnets, with the magnetic poles specifically or generally aligned. This enables it to be attached to an underlying surface, e.g. a metallic supermarket shelf. Other alternatives for attachment means could include magnetic strips, suckers, rubber anti-slip mats, rubber feet, sticky pads etc.

To enable similar units to be located and attached side-by-side on an underlying surface, the side surfaces of the unit may incorporate attachment means, e.g. also solid magnets with suitably aligned poles, or magnetic strips.

According to a fourth aspect of the present invention there is provided a modular lighting system comprising a plurality of interconnected generally planar units, each unit having at least one illumination element arranged to emit light from a major surface of the unit, and each unit having an electrical circuit incorporating the respective illumination element and having means for connecting it to an adjacent unit, and a power pack connected to one of the units.

According to a fifth aspect of the present invention there is provided a modular lighting system comprising a plurality of interconnected generally planar units, each unit having at least one illumination element arranged to emit light from a major surface of the unit, and each unit having an electrical circuit incorporating the respective illumination element and having means for connecting it to an adjacent unit, and a control means connected to the electrical circuits and capable of separately actuating each of the illumination elements.

The control means may be incorporated in one of the units. The system may be configured so that one of the units is automatically designated as a master unit to act as said control means, and at least one other unit is designated as a slave unit.

The actuation of the illumination elements is preferably effected in response to the output of a sensor such as a proximity sensor or a vibration sensor.

By placing the system on a supermarket shelf, and placing products such as bottles on or adjacent to the illumination elements, the products can be illuminated when customers are in the vicinity. A significant advantage of this system is that individual illumination elements do not need to be attached to each product, only to a display shelf for repeated use.

Preferred embodiments of the present invention will now be described, by way of example only, with reference to the accompanying drawings, of which.

Figure 1:
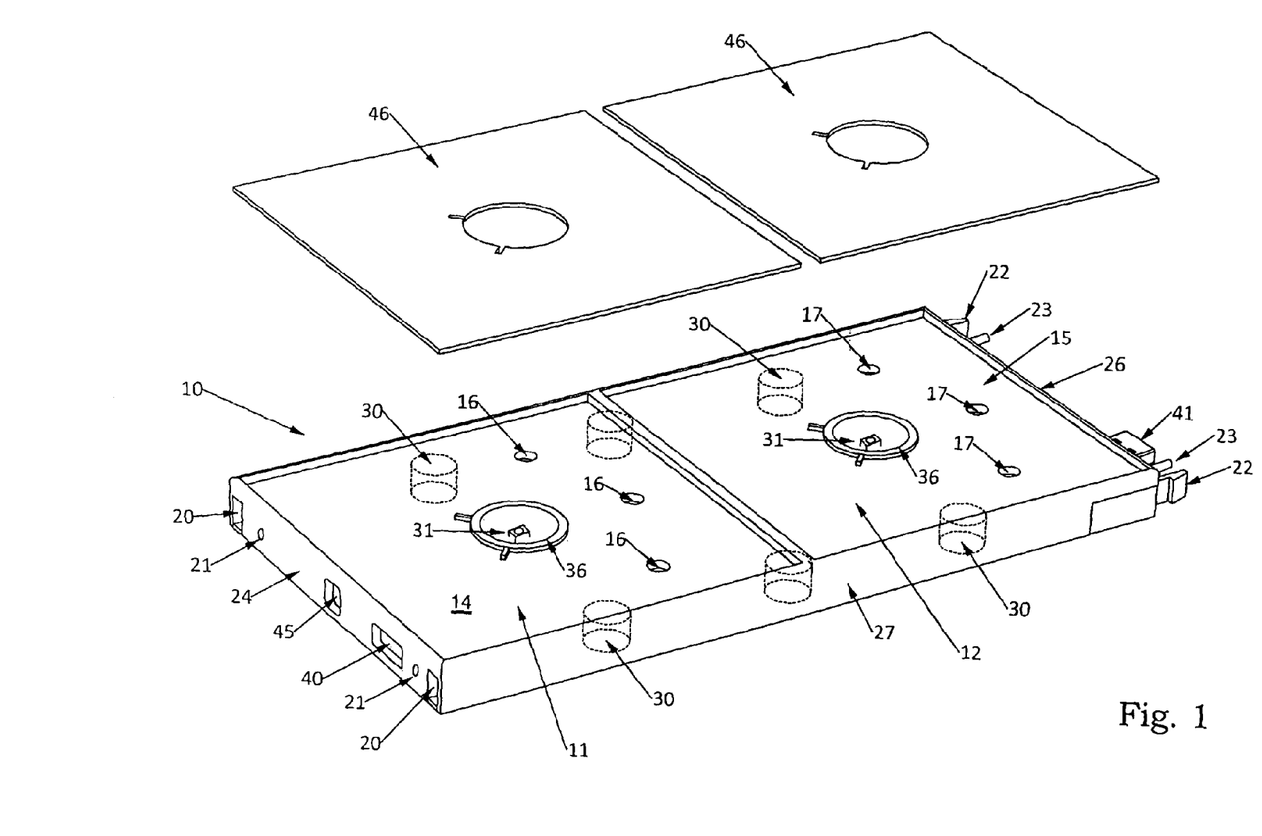
FIG. 1 is a perspective view of an illumination unit in accordance with a first embodiment of the present invention.

Referring to the drawings, an illumination unit 10 comprises a flat rectangular tile or housing member 15 made of ABS plastics material and having a thickness of approximately 1 cm. On the upper major surface 14 of the tile there are provided two bottle placement areas in the form of recesses 11, 12. Sensors 16, 17 in the form of pressure-sensitive switches are respectively associated with each area 11, 12 to detect the presence or absence of a bottle thereon. Each area has a high-intensity LED 31, at the centre thereof for illuminating the contents of a bottle placed thereon. Each LED is covered by a clear lens 36 which is flat on the inside surface but slightly curved on the top so that it acts as a convex lens and focuses the light from the LED upwards to the bottle. The lens is preferably of a plastics material such as polycarbonate which is hard-wearing and scratch resistant.

Fitted within each recess 11, 12 around the respective lens 36 and above the sensors 16, 17 is a 1 mm thick flexible sheet of plastic material 46. The sheets are glued to the bases of the respective recesses and can be printed upon and/or made from coloured or mirror finish material. The sheets 46 serve to increase the effective surface area for actuating the switches 11, 12.

Figure 3:
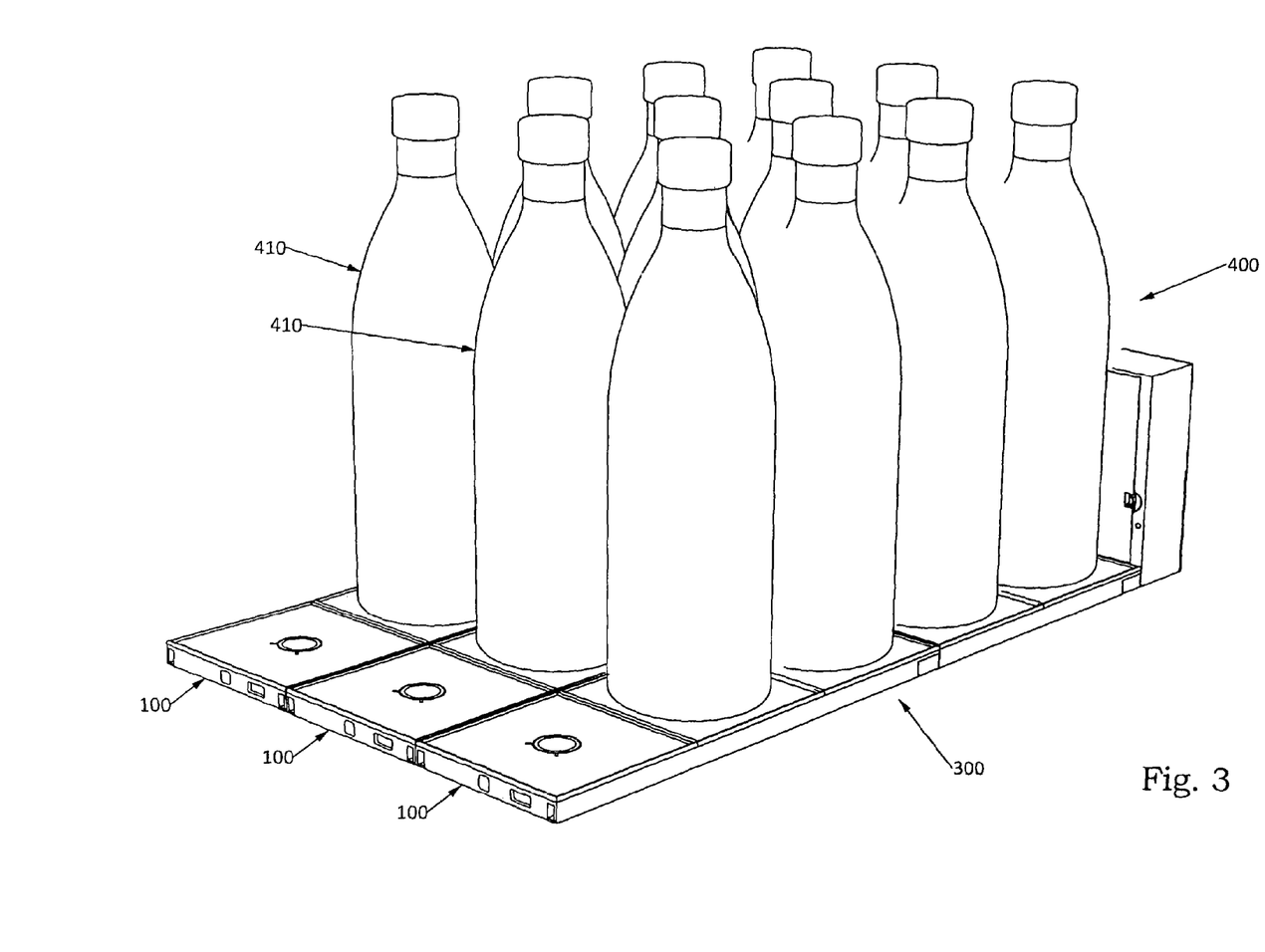
FIG. 3 is a perspective view in use of modular lighting systems according to the present invention.

On each end 24, 26 of the tile, there is provided at least one interlocking element for locating the tile relative to an adjacent tile (115, FIG. 3). The interlocking elements are conveniently constituted by a socket element 20 at one short end 24 of the tile and a matching plug element 22 projecting from the opposite short end 26. The socket element 20 and the matching plug element 22 may have magnets incorporated within or behind them in order to aid in locating and fixing adjacent tiles in place with respect to each other. To deter unauthorised detachment, the connection between the socket and plug elements 20, 22 includes a non-return ratchet clip which is hidden from view when the plug element 22 is fully inserted.

Electrical connections additional to the mechanical connections are provided between adjacent tiles. The electrical connections are USB type connector elements in the form of socket 40 and a corresponding plug 41. Both socket 40 and plug 41 include a plurality of internal connections.

The end 24 of the tile further includes a human proximity sensor 45 for detecting the approach of a person within a range of up to approximately 1 to 3 meters of the front of the unit. A Fresnel lens and passive infra-red sensor combination are preferably chosen to suit detection of human body heat at up to 3 meters in front and 2 meters across (in an arc) or as suitable for the application.

Each tile 15 further incorporates a vibration sensor embedded therein and thus not visible in the Figures.

Solid magnets 30 are buried within the tile which act through the plastic housing to attract the tile to a metal surface. The arrangement shown in FIG. 1 comprises six cylindrical magnets 30 held in place by plastic housing sockets designed for the magnets to "snap in" to.

The side surfaces 27 of the tile can be provided with similar cylindrical magnets or with suitably located magnetic strips whereby tiles can be attached to each other and held side-by-side on an underlying shelf.

Figure 2:
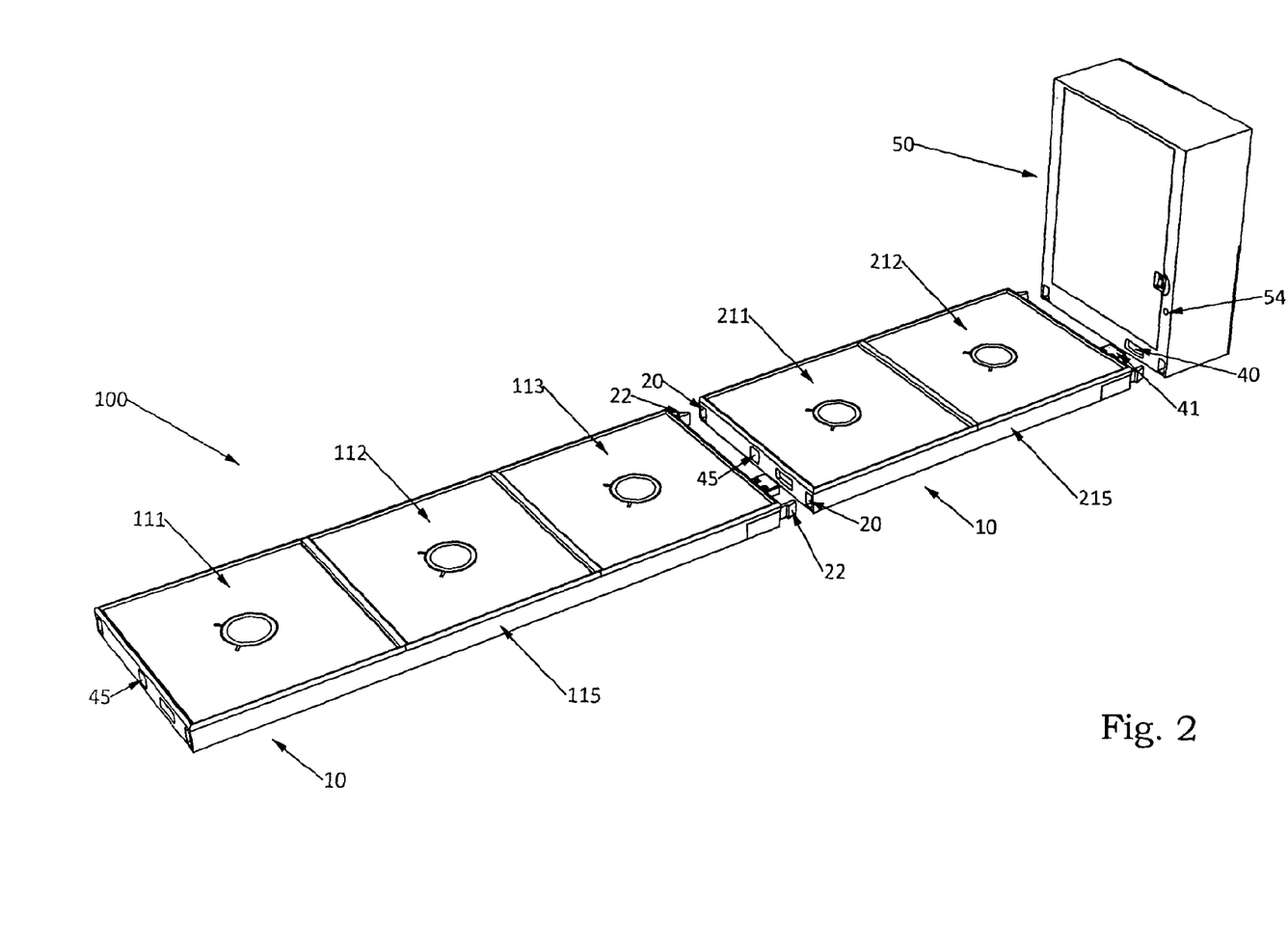
FIG. 2 is a perspective view of a modular lighting system in accordance with the present invention and comprising units as shown in FIG. 1 before interconnection thereof.

Referring now to FIG. 2, a modular lighting system 100 comprises two units or tiles, 115, 215 as shown in FIG. 1, arranged to be connected to each other by means of the plug and socket elements 22, 20. The end tile 215 is mechanically and electrically connected to a power unit 50 by plug and socket elements 20, 22. The power unit is also electrically connected to tile 115 via the electrical circuits in the intervening tile 215.

Power unit 50 incorporates a power pack comprising three or six D-type batteries for the electrical supply of the system. The power pack may have a low power indicator 54 or other indication system to provide information with regard to the status of the power level.

The circuitry within the units 10 is designed to be highly energy efficient to minimise their power requirements.

The power unit 50 also has internal fixed magnets at its bottom surface to enable it to be attached to and located on metallic shelving.

In use, tiles 115, 215 are assembled on the shelf in a supermarket or other sales outlet with the power unit 50 at the back of the shelf. The number of tiles chosen depends upon the depth of the shelf. Once interconnected, the tiles can communicate with each other and with the power unit 50. For example, the front unit (tile 115 in FIG. 2) is designated as the master unit, with the tile 215 intervening between it and the power unit 50 being designated as a slave unit. The proximity sensors 45 of any intervening tiles are obscured by the end of the respective tile in front thereof, and there thus rendered redundant. Because the proximity sensor 45 of the front tile 115 is not masked, and/or because the front tile does not have anything connected to its front socket 20, and/or because there is no communication with any tile in front, this tile acts as the master unit.

A preferred way of informing a tile that it is a slave unit is for a mechanical switch in its socket element 20 to detect the entry of the plug element 22 of a tile in front of it. This use of a simple mechanical switch requires a minimal amount of energy to indicate this status.

Once the tiles are connected together and communication between the tiles is established, the front tile designates itself as the master tile and the others as slave tiles. The vibration sensors within the slave tiles are, in the present embodiment, ignored and only the vibration detected by the master tile is used. However, the other vibration sensors may still be used by the overall system, if required.

In use, there are two main occasions when one would wish to illuminate an LED 31 to up-light a bottle placed on a respective area 11, 12. The first of these is when a potential customer approaches. The second is when a customer touches a bottle on the same shelf, which may or may not be a competitor's bottle.

In the first instance the approach of a customer is detected by the proximity sensor 45 of the front tile 115. Provided the front area 111 is occupied by a bottle, the circuitry within the tile 115 causes the LED of area 111 to be illuminated.

Should area 111 not be occupied by a bottle, sensors 16 indicate this to the circuitry. The interrogated circuitry can further interrogate in turn the other sensors until it detects the first of the areas 112, 113, 211, 212 to be occupied by a bottle. This then causes the LED of the first occupied area to be illuminated for a predetermined period e.g. five seconds. The LEDs of the areas in front of and behind the first occupied area are not illuminated, so that only a single LED is illuminated, i.e. the one illuminating the bottle which is in the view of the customer. Alternatively, the system of interconnected tiles and power pack may have other effects and patterns of illumination programmed in which may use any or all of the occupied areas to create an illumination show which can be designed for different creative requirements. Using unoccupied areas is not deemed useful, but these too may also be employed if desired.

In the second instance, when a customer touches the shelf or disturbs another article on the shelf, such as a competitor's bottle, this is detected by the vibration sensor of the front unit 115. Using the same method as described in the preceding paragraph, the circuitry then causes the front bottle to be illuminated by the LED of the corresponding placement area. Again, only one LED is illuminated. Alternatively, in modifications, other patterns of illumination may be used.

The above-described embodiments have a number of advantages.

In particular, the system is arranged to attract customers to a product while minimising power requirements. The use of high-intensity LEDs has the advantage of giving excellent illumination of the contents of bottles, even in very bright supermarket lighting environments. By only illuminating an occupied area furthest to the front the power requirements may be minimised. Lying in wait for a human body proximity or vibration event to occur uses very low power active circuitry. All other circuitry can be put into a very low power state until it is required, at which point it can be woken up by the low power sensor circuits to perform its function.

It is calculated that three D-type batteries can supply enough power for five hundred triggering operations per day, seven days a week, for three months.

In previous illumination arrangements, each light source was associated with a respective article, e.g. a drinks bottle. Embodiments of the present invention have the advantage that each light source is associated with a large number of successive articles. The need is avoided to attach the light source to respective articles for display, thus saving time and effort.

The panels 115, 215 are relatively thin and so do not cause any problems fitting them together with the bottles between two supermarket shelves. On typical supermarket shelving there is no ready access to mains power, so that the provision of an independent long-lasting battery-powered system is advantageous.

Because the system 100 is modular, its overall size can be customised to fit all shelving depths and widths. Only one type of uplighter is required that interlocks with identical units and a single power unit 50 at the rear. Thus no skill is necessary to assemble the system. The need for only a single power unit 50, for up to ten product placement positions saves valuable shelf space and expense. The tiles and the power unit are quickly and securely attachable to the shelving by means of the internal magnets at their lower surfaces.

In practice, several systems 100 are arranged side-by-side on a shelf 300, as shown in FIG. 3, each system having its own power unit 50 at the rear. Tiles in adjacent systems are conveniently located relative to each other magnetically. In such an expanded system 400, the placement areas form an array for the bottles 410.

In a modification, adjacent strips of tiles extending perpendicular to the front of the shelf may share a common power unit. Two, three or all such strips may share a power unit.

Instead of being arranged front to back on a shelf, a line of tiles may be arranged along a shelf. This is especially suitable for shelves in bars.

Various further modifications may be made to be above-described tiles. For example, an infra-red communications system can be provided in addition to the electrical communications system. Thus each end 24, 26 of the tile may also incorporate an infra-red communications port 42 for data and control signal communications between adjacent units. The tiles adjacent to the left or right may be communicated with by using infra-red links to involve them in the illumination and sensing events. An advantage of this is that the only requirement is for the tiles to be satisfactorily aligned; there is no need for mechanical or electrical links. Alternatively the tiles may communicate wirelessly.

The proximity sensor 45 and/or the vibration sensor may be omitted.

Instead of, or in addition to the other sensors, each tile may be provided with a radio signal receiver. When this receives a radio communication, one or more of the light elements 31 32 may be illuminated. Thus if the articles are drinks bottles on a shelf in a bar, a bartender may cause a signal to be sent to the units when he picks up a corresponding bottle having a radio transmitter. In particular a suitable radio frequency transmitter can be incorporated into a motion-activated illumination device as disclosed in WO2011/007113.

Instead of inbuilt magnets 30, the bottom of the tile, i.e. the surface opposite 14, may incorporate magnetic strips so as to be capable of ready attachment and location on metallic shelves. The means for attaching the power unit 50 to a shelf may also be modified in the same way. Locating magnets may also be provided on the side surfaces 27 with their poles oriented such that the sides of mutually-adjacent tiles attract.

The magnetic means may be replaced or supplemented by other attachment means; alternatively there may be no attachment means to the shelving, the tiles being simply placed on the shelving and interlocked with each other and the power unit.

In addition to providing a mechanical interconnection to mutually locate adjacent tiles, the elements 20, 22 may also incorporate electrical connections between adjacent tiles for selectively illuminating the LEDs 31, 32.

The interlocking elements 20, 22 may be augmented by interlocking elements 21, 23 adjacent the other extremity of the ends 24, 26; this increases the ease and accuracy of correctly aligning the tiles in a system.

The lenses of the areas 11, 12 can be of square, round, elliptical or other shape In general the tiles can be used to illuminate many different types of containers, such as spirits bottles, and the shapes of areas 11, 12 may be further modified to suit specific containers. Other types of lighting elements than LEDs 31, 32 may be used.

The tiles may have various manual input control elements to selectively activate or deactivate any of the features of the system. For example, the vibration sensor feature and/or the proximity sensor feature may be switched off. The illumination pattern of the LEDs 31, 32 may be overridden. For example the LEDs may be all switched permanently on, or permanently flashing, or off. Although, as described above, only the vibration sensor of the front tile 115 is active, the vibration sensors of the other tiles can be selectively actuable instead or in addition.

Each tile 15 can have one, two, three, four or more areas 11, 12 thereon arranged in any pattern or array. Three versions of the tile are usually provided, viz tiles with one (not shown) two or three areas 11, 12. This means that the assembly can be provided with any desired number of areas in a line.

The bottle sensors 16, 17 may act on a photosensitive, capacitive, weight-sensing or other basis.

Instead of all units 10 being the same, respectively different units could be supplied already designated as master units and slave units. In particular the slave units could be made without proximity sensors. This reduces unit costs, but is not so advantageous in terms of rationalising manufacture and ease of use in a supermarket environment.

In a modified system, batteries are incorporated in the individual tiles 15 rather than the power unit 50. This may increase the thickness of the tile to at least 1.2 cm depending on the batteries used.

In a further modification, the control function is contained in the power unit 50. This has the advantage of allowing a complete change in illumination effect or function by simply replacing the power unit or by changing a configuration of switches or other method within the power unit. This may be done at the same time as removing the power unit to replace exhausted batteries for example. This also removes the requirement to change a configuration within each tile and allows the whole system to be adaptable and re-useable across many different promotions and products. The following specific options can be provided.

Option 1: The effect, to be performed by the LEDs, is present at the time of manufacturing. The effect cannot be altered and each time the unit is triggered the effect is the same. To change the effect the microcontrollers must be re-programmed.

Option 2: The effect or effects are present at the time of manufacturing. The effect sequence cannot be altered (without reprogramming). Each time the unit is triggered the effect is the next effect in a sequence or pre-programmed effects.

Option 3: There is a set of switches on the power unit. The power unit can be disconnected, the switch settings can be changed, and then upon reconnection the tiles perform a new effect dependent on the new switch settings.

The modular lighting system can be used to illuminate other products, such as jars or packets. It can also be used in applications other than sales, e.g. in advertising or other information-conveying applications.

In some embodiments, the areas 11, 12 may have a dome-shaped centred region to fit within the recess in the bottom of a bottle to be placed thereon.

Instead of using a single LED colour under each placement area, multiple different LEDs of different colours could be used. Different bottle and liquid colours require different colours of light to illuminate them effectively so the ability to change to different LED colours offers the ability to use a single unit to illuminate an array of different bottle/liquid colours. A single RGB LED could also be used to achieve this end.

Other sensor types could also be used, for example microphones could be utilised especially if the units were used in clubs and bars for display purposes of bottles behind the bar. The units could illuminate the bottles in time to the music. Additionally temperature sensing could illuminate the product when too warm or too cold or at just the right temperature. Light sensors could also be utilised whereby when a predetermined light level is reached, or a range of light level is attained, the units illuminated the bottles in some way. Other sensor types could also be incorporated.

When actuated, the tiles may be configured to produce an audio signal instead of, or in addition to, a light signal.

Figure 4:
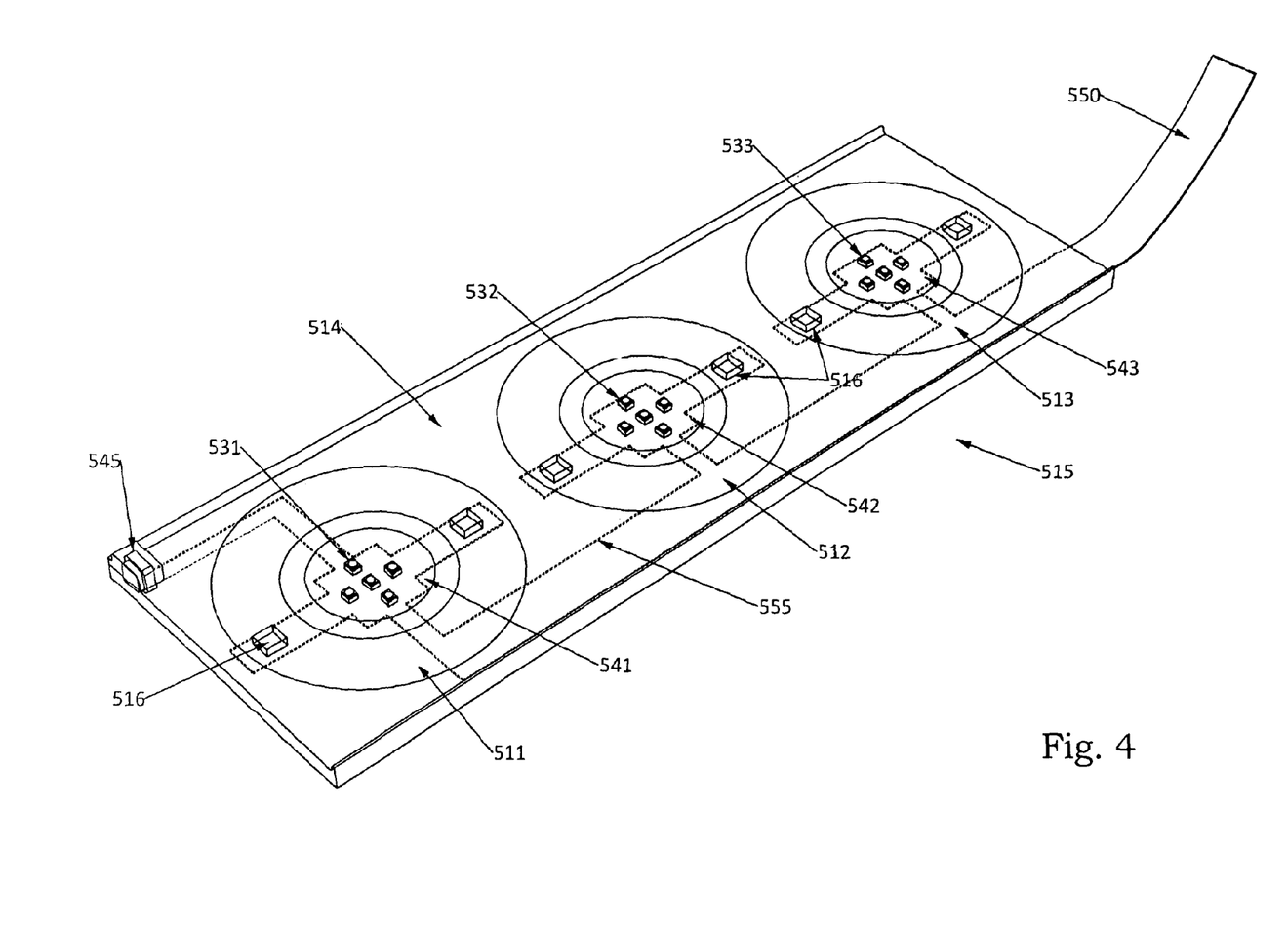
FIG. 4 is a perspective view of an illumination unit in accordance with a second embodiment of the present invention.

The tiles may be of flexible material so that they are in the form of mats. The mats can be rubberised and have embedded membrane switches corresponding to each product placement area. The top surface of each mat may be shaped to have ridges thereon which guide the products to be accurately positioned. Such an arrangement is shown in FIG. 4 which is a perspective view of an illumination unit in accordance with a second embodiment of the present invention where the body material is a generally transparent flexible rubber material such as that used for architectural LED strips. The shape of this material can be altered easily to match the base regions of specific containers. A tile or housing member 515 has three bottle placement areas 511, 512, 513 in the form of circular recesses in the top surface 514, which are transparent at the respective central regions 541, 542, 543 thereof, through which shine groups of LEDs 531, 532, 533. In each placement area are located two diametrically-opposed pressure-actuated switches 516 to detect whether or not a bottle is present.

To sense the presence or approach of a person, a passive infra-red sensor (PIR) 545 is provided on the front end of tile 515.

Instead of a power pack 50 positioned directly behind the tile, tile 515 is connected to its power pack (not shown) by a suitably-rated ribbon cable 550. This enables the power pack to be attached to associated shelving at any convenient location which is out of sight and does not reduce the space available for bottles. The cable 550 is connected to the components of tile 515 by conductive tracks of a flexible circuit cable 555 shown in dotted lines in FIG. 4.

An advantage of the configuration of the pressure switches 516 is that they maximise the chances of a positive actuation when a bottle is present.

Tile 515 is represented as a stand-alone tile; it can be provided with end and/or side connectors for attachment to adjacent tiles if desired. Instead of being flexible it may be of rigid material.

Figure 5:
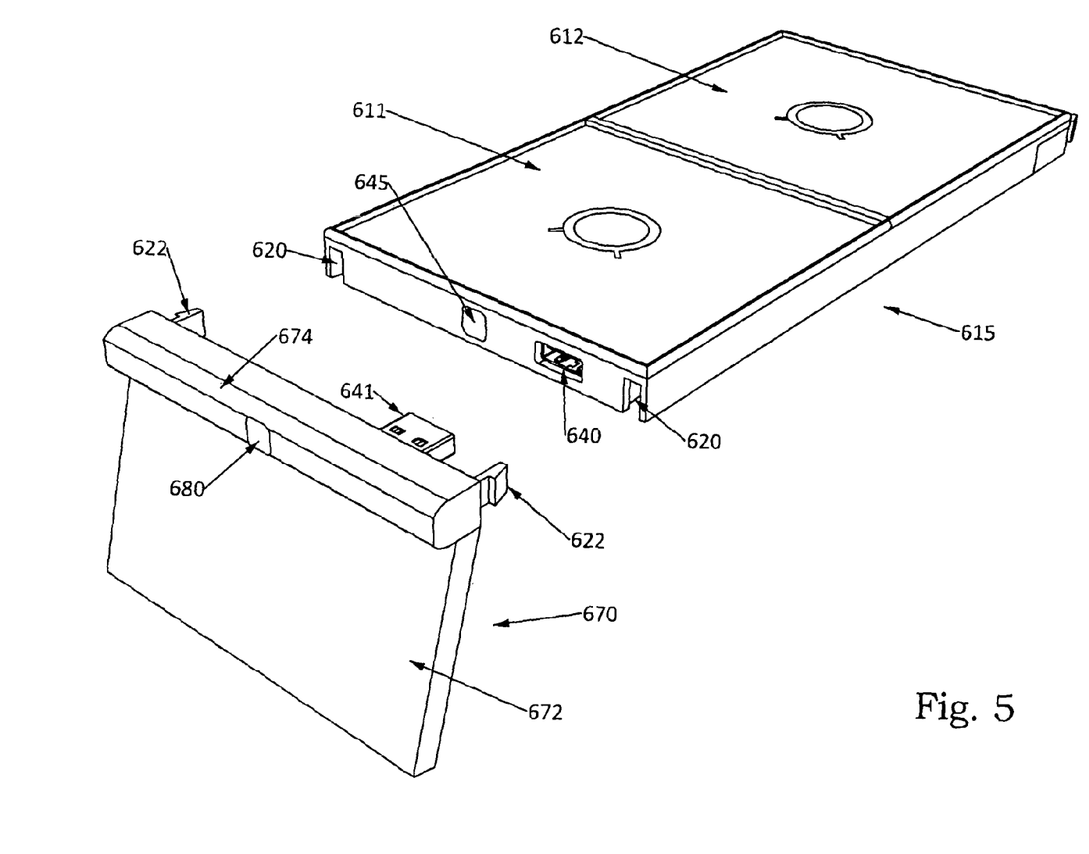
FIG. 5 is a perspective view of an illumination unit in accordance with a third embodiment of the present invention.

FIG. 5 is a perspective view of a tile 615 in combination with a front-facing display element 670 in accordance with a third embodiment of the present invention. Similarly to the previous embodiments, tile 615 includes product placement areas 611, 612, an electrical connection socket 640, mechanical connection socket elements 620 and a passive infra-red sensor 645.

The display element 670 comprises a display panel 672 which is connected to tile 615 by means of a bar element 674 which has an electrical connection plug 641, mechanical connection plug elements 622, and a transparent opening 680 which is aligned with sensor 645 when plug elements 622, 641 are snapped in to socket elements 620, 640.

Control circuitry for the display element is contained within tile 615.

The display element 670 permits the advertisement of brand information, pricing or specific promotional messages about the bottles or product that are placed on the tile 615 behind the display element. The display element clips onto the front facing edge of the leading tile 615 and uses spare communications and power links in the tile to enable the display of electronic messages or animated displays to catch a shopper's eye. These messages can take the form of scrolling or animated text, or the effect created can take the form of a backlighting strip for illuminating pre-printed graphics on a laminated paper. The display element can be human body proximity activated, vibration activated, sound activated, or activated randomly or specifically at certain times. In the case of proximity sensing activation, it uses the PIR sensor 645 in the leading tile which is visible through opening 680. The display element 670 can derive its illumination from LEDs or from electroluminescent material or by other means. Alternatively it could be in the form of a graphics display. LEDs could be used in dot matrix format to allow scrolling message options. A standard PCB could be developed that could be populated with LEDs in specific locations to allow customisable messages for clients or to backlight specific areas on bespoke graphics created by clients. LCD displays could also be used, as could video messaging and interactive displays, e.g. iPad type tablets. These can all link directly into tile 615 and be controlled by the tile control circuitry.

In modifications, control circuitry for the display element 670 is alternatively or electrically contained within bar element 674 and/or within or behind display section 672.

Instead of transparent opening 680, the display element may have its own PIR sensor.

In addition, the display unit can carry information which is transferred to the tiles when the display unit is connected to the front tile. This new information can alter the illumination effect or pattern of the LEDs in the container placement areas. This provides for a quick method for updating the main tile illumination effects so they behave in a manner corresponding to the display appearing at 672.

The features and modifications of the various embodiments may be combined or exchanged as desired.

What is claimed is:

1. A generally planar unit having at least one illumination element on a major surface thereof, and electrical circuits for providing electrical power to the illumination element, the circuits comprising at least one first sensor located adjacent to the illumination element for sensing the presence of an article placed on said major surface at a location, said location on said major surface being over the illumination element, and a second sensor for sensing the presence or movement of a person adjacent to the unit, said second sensor being located at or adjacent an end of the unit, wherein activation of at least one of the first sensor or the second sensor causes the electrical circuits to enable illumination of the illumination element, the article being illuminated by the illumination of the illumination element which it is over or to which it is adjacent.

2. A unit according to claim 1, configured such that at least one selected illumination element is illuminated only when both said first sensor and said second sensor are actuated.

3. A unit according to claim 2, wherein the second sensor is a proximity sensor.

4. A unit according to claim 1, further comprising a vibration sensor.

5. A unit according to claim 1, and comprising externally accessible electrical connection means.

6. A unit according to claim 1, and comprising mechanical connection means for connecting the unit to a similar unit.

7. A unit according to claim 1, and incorporating magnetic locating elements.

8. A generally planar unit according to claim 1 having a communications link connected to control the illumination element, the output of the sensor device being connected to control the communications link.

9. A modular lighting system comprising a plurality of interconnected units according to claim 8.

10. A modular lighting system comprising a plurality of interconnected generally planar units, each unit having at least one illumination element arranged to emit light from a major surface of the unit, and an electrical circuit incorporating the respective illumination element(s) and having means arranged to connect it to an adjacent unit, each electrical circuit further comprising a respective first sensor associated with each illumination element, the first sensor being located adjacent to the respective illumination element and being arranged to be actuated by the presence of an article placed on said major surface at a location, said location on said major surface being over the respective illumination element, the system being configured such that when the presence of at least one article is sensed, the illumination is enabled of at least a respective one of the illumination elements, wherein at least one of the units comprises at least one second sensor, actuation of which enables illumination of said respective one of the illumination elements, said second sensor being a different type of sensor from said first sensor and being located at or adjacent an end of said at least one unit, wherein activation of at least one of said first sensor or the said second sensor causes said electrical circuit to enable illumination of the respective illumination element, said at least one articles being illuminated by the illumination of the respective illumination element.

11. A system according to claim 10, wherein the illumination elements of all the units are arranged in a line and said at least one selected illumination element corresponds to the endmost first sensor which senses the presence of an article.

12. A system according to claim 10, wherein the second sensor is a proximity sensor.

13. A system according to claim 12, wherein there are further provided vibration sensing means and/or microphones and/or temperature sensing means and/or light-sensing means.

14. A system according to claim 10, wherein interlocking mechanical connection elements are provided between the units.

15. A system according to claim 10, wherein the units are substantially identical.

16. A system according to claim 10, further comprising an electrical display element having electrical connection means compatible with the connection means between the units, whereby it can be connected to an endmost unit.

17. A system according to claim 16, wherein the electrical display element is generally planar, and extends transversely, in particular substantially perpendicularly, to the endmost unit.

18. A system according to claim 10, wherein the units incorporate magnetic locating elements.

19. A system according to claim 10, wherein the at least one selected illumination element is illuminated only when both said first sensor and said second sensor are actuated.

\* \* \* \* \*